(12) United States Patent
Park et al.

(10) Patent No.: US 11,102,088 B2
(45) Date of Patent: Aug. 24, 2021

(54) COMMUNICATION DATA MODELING METHOD (71) Applicant: LSIS CO., LTD., Anyang-si (KR)

(72) Inventors: Hun Park, Anyang-si (KR);
Young-Gyu Yu, Anyang-si (KR);
Jae-Shik Yoon, Anyang-si (KR);
Seong-Joon Lee, Anyang-si (KR)

(73) Assignee: LSIS CO., LTD., Anyang-si (KR)

( * ) Notice: Subject to any disclaimer, the term of this patent is extended or adjusted under 35 U.S.C. 154(b) by 128 days.

(21) Appl. No.: 16/482,597

(22) PCT Filed: Jul. 31, 2017

(86) PCT No.: PCT/KR2017/008230
§ 371 (c)(1),
(2) Date: Jul. 31, 2019

(87) PCT Pub. No.: WO2018/151384
PCT Pub. Date: Aug. 23, 2018

(65) Prior Publication Data
US 2020/0195529 A1 Jun. 18, 2020

(30) Foreign Application Priority Data
Feb. 14, 2017 (KR) .................. 10-2017-0020220

(51) Int. Cl.
*H04L 12/24* (2006.01)
*H04L 29/06* (2006.01)

(52) U.S. Cl.
CPC ........ *H04L 41/5054* (2013.01); *H04L 41/145* (2013.01); *H04L 69/03* (2013.01)

(58) Field of Classification Search
CPC .... H04L 41/5054; H04L 41/145; H04L 69/03
See application file for complete search history.

(56) References Cited

U.S. PATENT DOCUMENTS

| 5,388,320 A | 2/1995 | Smith et al. |
| 7,395,195 B2 | 7/2008 | Suenbuel et al. |

(Continued)

FOREIGN PATENT DOCUMENTS

| CN | 102004817 A | 4/2011 |
| CN | 102419838 A | 4/2012 |

(Continued)

OTHER PUBLICATIONS

Yang, et al.; "SDL-OPNET Co-Simulation Technique for the Development of Communication Protocols with an Integrated Approach to Functional Verification and Performance Evaluation"; Jan. 2010; (10 pages).

(Continued)

*Primary Examiner* — Benjamin M Thieu
(74) *Attorney, Agent, or Firm* — K&L Gates LLP (57) ABSTRACT

The present invention relates to a communication data modeling method. The communication data modeling method according to one embodiment of the present invention comprises the steps of: identifying a service list of an electronic device; making a first communication data sheet for communication protocol standards of the electronic device; making a second communication data sheet for products related to the electronic device; making a final communication data sheet by combining the first communication data sheet and the second communication data sheet; and creating a communication data model on the basis of the final communication data sheet.

5 Claims, 7 Drawing Sheets

(56) References Cited

U.S. PATENT DOCUMENTS

| | | | |
|---|---|---|---|
| 8,549,198 B2 | 10/2013 | Cohen et al. | |
| 8,819,170 B2 | 8/2014 | Cohen et al. | |
| 2006/0224628 A1* | 10/2006 | Gupta | G06Q 10/06 |
| 2014/0201321 A1 | 7/2014 | Donaghey et al. | |
| 2014/0325096 A1 | 10/2014 | Jung et al. | |
| 2015/0356244 A1 | 12/2015 | Seethamraju | |

FOREIGN PATENT DOCUMENTS

| | | |
|---|---|---|
| CN | 103227779 A | 7/2013 |
| CN | 103957204 A | 7/2014 |
| CN | 105226726 A | 1/2016 |
| EP | 1988672 A1 | 11/2008 |
| EP | 2472448 A1 | 7/2012 |
| JP | 2004193816 A | 7/2004 |
| JP | 2006236314 A | 9/2006 |
| JP | 2014182746 A | 9/2014 |
| JP | 2015520993 A | 7/2015 |
| KR | 20030054505 A | 7/2003 |
| KR | 1020050055260 A | 6/2005 |
| KR | 100659231 B1 | 12/2006 |
| KR | 100813430 B1 | 3/2008 |
| KR | 20090036187 A | 4/2009 |
| KR | 101122418 B1 | 3/2012 |
| KR | 101411128 B1 | 6/2014 |
| KR | 20150012741 A | 2/2015 |

OTHER PUBLICATIONS

Written Opinion for related International Application No. PCT/KR2017/008230; action dated Aug. 23, 2018; (4 pages).

International Search Report for related International Application No. PCT/KR2017/008230; action dated Aug. 23, 2018; (3 pages).

Extended European Search Report for related European Application No. 17897101.6; action dated Aug. 28, 2020; (7 pages).

Chinese Office Action for related Chinese Application No. 201780086020.7; action dated Mar. 31, 2021; (8 pages).

Japanese Notice of Allowance for related Japanese Application No. 2019-536565; action dated Apr. 9, 2021; (3 pages).

\* cited by examiner

FIG. 7

COMMUNICATION DATA MODELING METHOD

CROSS-REFERENCE TO RELATED APPLICATIONS

The present application is a National Stage of International Application No. PCT/KR2017/008230 filed Jul. 31, 2017, which claims priority to Korean Application No. 10-2017-0020220 filed on Feb. 14, 2017 the disclosures of which are incorporated herein by reference.

TECHNICAL FIELD

The present disclosure relates to a communication data modeling method.

BACKGROUND ART

Conventionally, a communication information model was designed using a system engineering technique.

Figure 1:
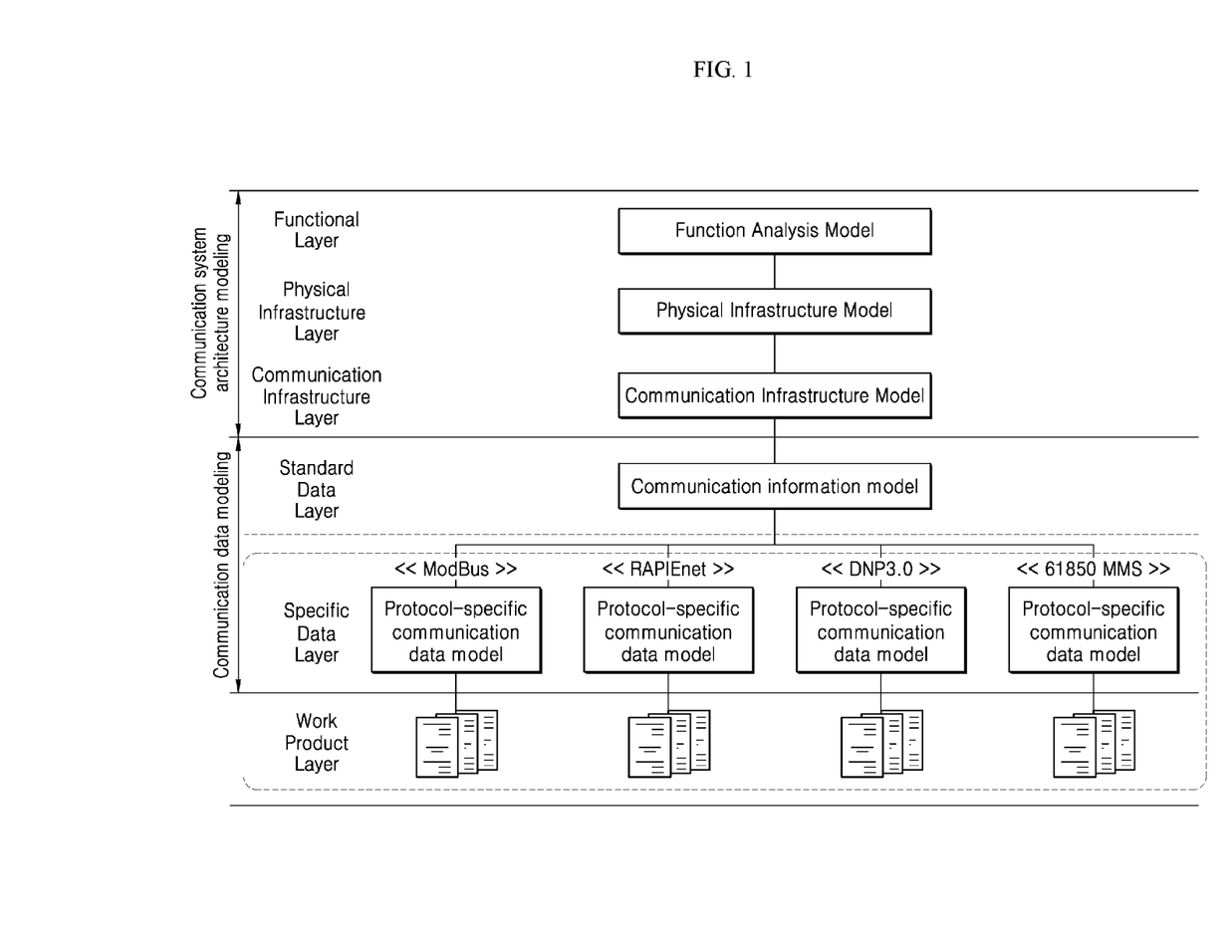
FIG. 1 is a schematic diagram for describing a communication data modeling method using a system engineering technique.

FIG. 1 is a schematic diagram for describing a communication data modeling method using a system engineering technique.

Referring to FIG. 1, the conventional method analyzes a use case based on requirements of a communication system, and creates a communication model for each of layers based on the analysis result (for example, Function Analysis Model for Functional Layer; Physical Infrastructure Model for Physical Infrastructure Layer; Communication Infrastructure Model for Communication Infrastructure Layer). (This modeling is referred to as a communication system architecture modeling). When the communication infrastructure model which can identify communication requirements between devices is completed, a communication information model (for a model for a standard data layer) is completed based on the communication infrastructure model. This communication information model creation method is called a system engineering technique.

Further, a product developer maps communication protocols located in a specific data layer to products located in a work product layer respectively based on the communication information model created from the above-described process, thereby to complete a communication data model for each product. This is called a communication data modeling.

Although the communication data model creation method as described above is useful for developing a new product, the communication data model creation method as described above has a problem that this method is not suitable as a process for creating a standardized communication data model based on a plurality of existing products.

DISCLOSURE

Technical Purposes

A purpose of the present disclosure is to provide a communication data modeling method that creates a standardized communication data model by considering both a product and a communication protocol standard related to an electronic device.

Technical Solutions

A communication data modeling method in accordance with the present disclosure as configured to achieve the above purpose may include: identifying service lists of an electronic device; creating a first communication data sheet about a communication protocol standard of the electronic device; creating a second communication data sheet about a product associated with the electronic device; creating a final communication data sheet by combining the first communication data sheet and the second communication data sheet; and creating a communication data model based on the final communication data sheet.

The identifying of the service lists of the electronic device includes: when a communication protocol standard associated with the electronic device is present, selecting a representative communication protocol standard to derive the service lists of the electronic device; and when a communication protocol standard associated with the electronic device is absent, selecting a representative product to derive the service lists of the electronic device.

The representative communication protocol standard is selected. The identifying of the service lists of the electronic device includes: identifying the service lists of the electronic device based on the selected representative communication protocol standard; inputting details of the identified service lists; identifying remaining service lists of the electronic device excluding the identified service lists, based on a product of the electronic device; and inputting details of the identified product-based service lists.

The representative product is selected. The identifying of the service lists of the electronic device includes identifying the service lists of the electronic device based on the selected product; and inputting details of the identified service lists.

The creating of the first communication data sheet includes analyzing the communication protocol standard of the electronic device; identifying a service list corresponding to the communication protocol standard based on the analysis result; identifying first data items associated with the communication protocol standard based on the identified service list; and inputting details of the identified first data items.

The creating of the second communication data sheet includes analyzing existing communication data of a product associated with the electronic device; identifying a service list corresponding to the product based on the analysis result; identifying second data items associated with the product based on the identified service list; and inputting details of the identified second data items.

The creating of the final communication data sheet includes aligning the first data items and second data items with each other; deriving a common name of each of pairs of corresponding data items between the first data items and second data items to create combined data items; inputting details of the combined data items based on the details of the first data items and the details of the second data items; distinguishing a data model of the combined data items; selecting a communication protocol standard of the electronic device; selecting a product corresponding to the selected communication protocol standard based on the second data items and on a service list basis; and inputting details related to the selected product into details of the communication protocol standard on a service list basis.

The communication protocol standard of the electronic device includes a plurality of communication protocol standards, wherein the product associated with the electronic device includes a plurality of products.

Technical Effects

As described above, the standardized communication data model may be created using the communication data modeling method according to the present disclosure. A product developer can easily develop a product based on the standardized communication data model.

Specific effects of the present disclosure together with the effects as described above, will be described with reference to following specific details for carrying out the present disclosure.

DETAILED DESCRIPTIONS

The foregoing purposes, features and advantages of the present disclosure will become more fully apparent from following descriptions taken in conjunction with the accompanying drawings. Accordingly, those of ordinary skill in the art to which the present disclosure belongs may readily implement a technical idea of the present disclosure. In describing the present disclosure, when it is determined that specific descriptions of well-known components or processes related to the present disclosure may unnecessarily obscure the gist of the present disclosure, the detailed descriptions thereof will be omitted. Hereinafter, a preferred embodiment according to the present disclosure will be described in detail with reference to the accompanying drawings. In the drawings, the same reference numerals are used to denote the same or similar elements.

Hereinafter, a communication data model creation system 100 according to one embodiment of the present disclosure will be described with reference to FIG. 2.

Figure 2:
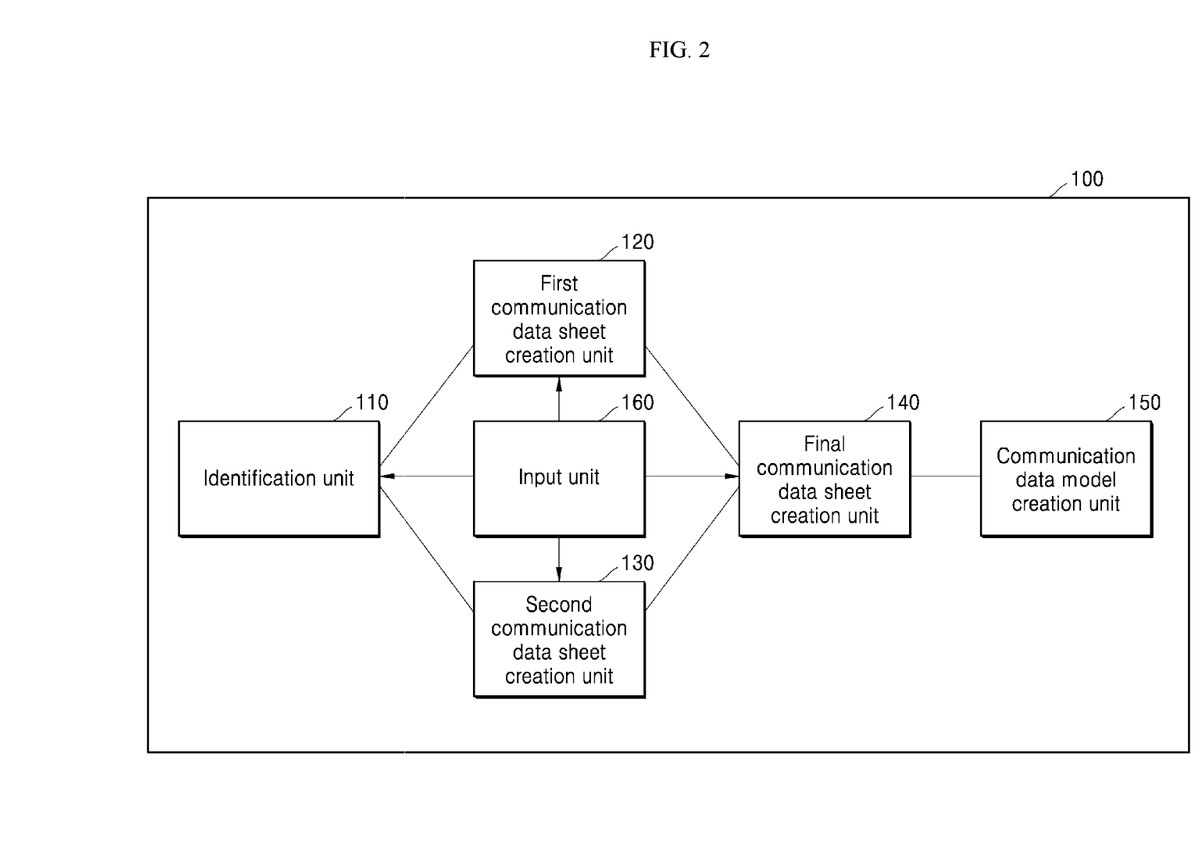
FIG. 2 is a block diagram for describing a communication data model creation system according to one embodiment of the present disclosure.

FIG. 2 is a block diagram for describing a communication data model creation system according to one embodiment of the present disclosure.

Referring to FIG. 2, a communication data model creation system 100 according to one embodiment of the present disclosure may include an identification unit 110, a first communication data sheet creation unit 120, a second communication data sheet creation unit 130, a final communication data sheet creation unit 140, a communication data model creation unit 150, and an input unit 160.

The identification unit 110 may identify a service list of an electronic device (not shown).

Specifically, the identification unit 110 may determine whether there is a communication protocol standard associated with the electronic device and may identify a service list based on the determination result.

For example, the electronic device may be, for example, an inverter, a PLC (Power Line Communication) device, an HMI (Human Machine Interface) device, or a DCS (Distributed Control System).

In an alternative, the electronic device may include multiple electronic devices. The identification unit 110 may identify a service list of each of the plurality of electronic devices.

However, for convenience of description, an identification operation of the identification unit 110 for one electronic device will be described by way of an example herein.

The service may mean, for example, a service that the electronic device should supply to an external equipment or a user associated with the electronic device.

Therefore, the service provided by the electronic device may be made via interaction, that is, communication between the electronic device and the external equipment or user.

Further, the electronic device may provide a function to the external equipment or user via the service. Thus, the electronic device may include a variety of data and functions to realize the service.

When the identification unit 110 identifies the service list of the electronic device and then it is determined that when there is the communication protocol standard associated with the electronic device, a representative communication protocol standard for deriving the service list of the electronic device may be selected. When it is determined that when there is not the communication protocol standard associated with the electronic device, a representative product for deriving the service list of the electronic device may be selected.

In this connection, when the communication protocol standard related to the electronic device exists and thus the representative communication protocol standard is selected, the identification unit 110 may identify the service list of the electronic device based on the representative communication protocol standard as selected. Then, the input unit 160 may input details of the identified service list.

Further, the identification unit 110 may identify service lists except for the identified service list among the service lists of the electronic device, based on each product of the electronic device. The input unit 160 may input the details of the identified service list for each product.

To the contrary, when the representative product is selected because there is no communication protocol standard associated with the electronic device, the identification unit 110 may identify the service list of the electronic device based on the selected representative product. The input unit 160 may input the details of the identified service list.

The first communication data sheet creation unit 120 may create a first communication data sheet for the communication protocol standard of the electronic device.

Specifically, the first communication data sheet creation unit 120 may analyze the communication protocol standard of the electronic device and may identify a service list corresponding to the communication protocol standard based on the analysis result. Then, the first communication data sheet creation unit 120 may identify first data items associated with the communication protocol standard based on the identified service list.

Using this process, the first communication data sheet creation unit 120 may create the first communication data sheet, i.e., a communication data sheet for each communication protocol standard. Then, the input unit 160 may input details of the identified first data items.

In one example, the communication protocol standard of the electronic device may include a plurality of communication protocol standards. The first communication data sheet creation unit 120 may analyze the plurality of communication protocol standards, and identify a service list corresponding to each communication protocol standard based on each result of analysis. However, for convenience of description herein, an operation of the first communication data sheet creation unit 120 for one communication protocol standard will be described by way of an example.

The second communication data sheet creation unit 130 may create a second communication data sheet for a product associated with the electronic device.

Specifically, the second communication data sheet creation unit 130 may analyze existing communication data of the product related to the electronic device and may identify a service list corresponding to the product based on the analysis result. Then, the second communication data sheet creation unit 130 may identify second data items associated with the product based on the identified service list.

Using this process, the second communication data sheet creation unit 130 may create a second communication data sheet, i.e., a product-based communication data sheet. Then, the input unit 160 may input details of the identified second data items.

In one example, there may be a plurality of products associated with the electronic device. In this case, the second communication data sheet creation unit 130 may analyze the existing communication data of the plurality of products and identify a service list corresponding to each product based on each analysis result. However, for convenience of description herein, an operation of the second communication data sheet creation unit 130 for one product will be described by way of example.

The final communication data sheet creation unit 140 may create a final communication data sheet by combining the first communication data sheet and the second communication data sheet.

Specifically, the final communication data sheet creation unit 140 may respectively align the first data items and the second data items with each other, and derive a common name of each of pairs of corresponding data items between the first data items and the second data items, thereby to create combined data items. In this connection, the input unit 160 may input details of the combined data items based on the details of the first data items and the details of the second data items.

The final communication data sheet creation unit 140 then may identify the data model of the combined data items, and may select a communication protocol standard for the electronic device. Further, the final communication data sheet creation unit 140 may select products corresponding to the selected communication protocol standard on a service list basis, based on the second data items.

Using this process, the final communication data sheet creation unit 140 may create the final communication data sheet in which the communication protocol standard-based communication data sheet and the product-based communication data sheet are combined to each other. The input unit 160 may input details related to the selected products into the details of the communication protocol standard on a service list basis.

The communication data model creation unit 150 may create a communication data model i.e., a standardized communication data model, based on the final communication data sheet.

The input unit 160 may input the details of the service lists, the details of the first or second data items, the details of the combined data items, and the details of the communication protocol standard, as described above.

Specifically, the input unit 160 may receive input from the user or the external device and input the above defined details.

Hereinafter, the communication data modeling method by the communication data model creation system of FIG. 2 will be described with reference to FIG. 3 to FIG. 7.

Figure 3:
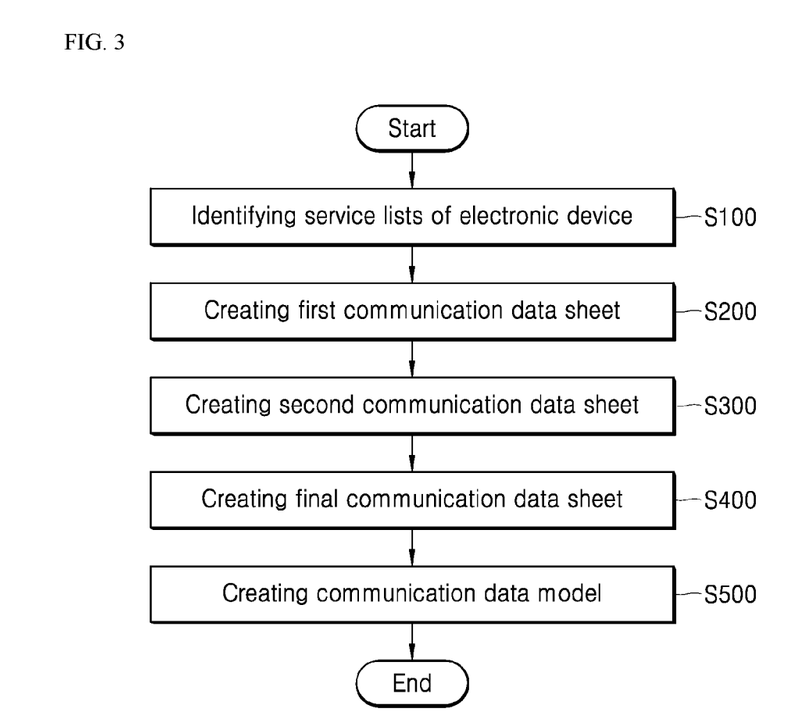
FIG. 3 is a flow chart for describing a communication data modeling method by the communication data model creation system in FIG. 2.
Figure 4:
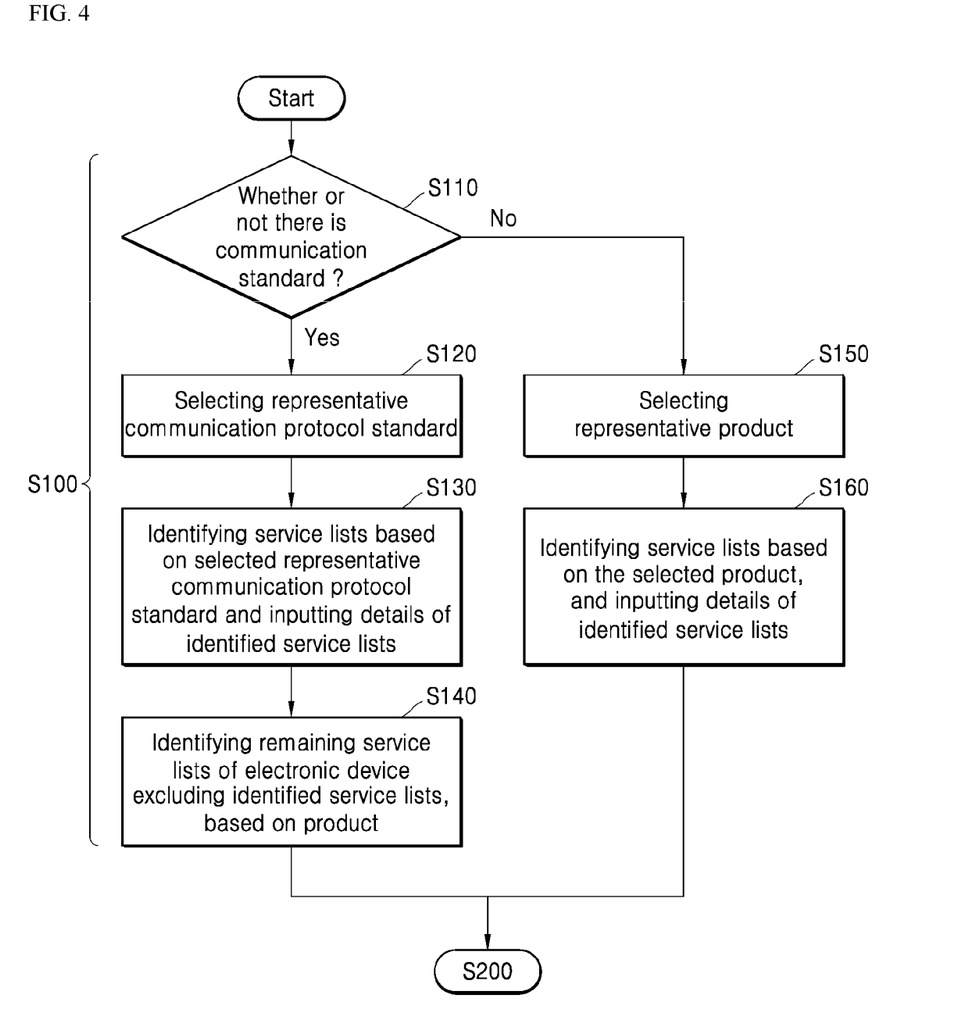
FIG. 4 is a flow chart for describing S100 in FIG. 3
Figure 5:
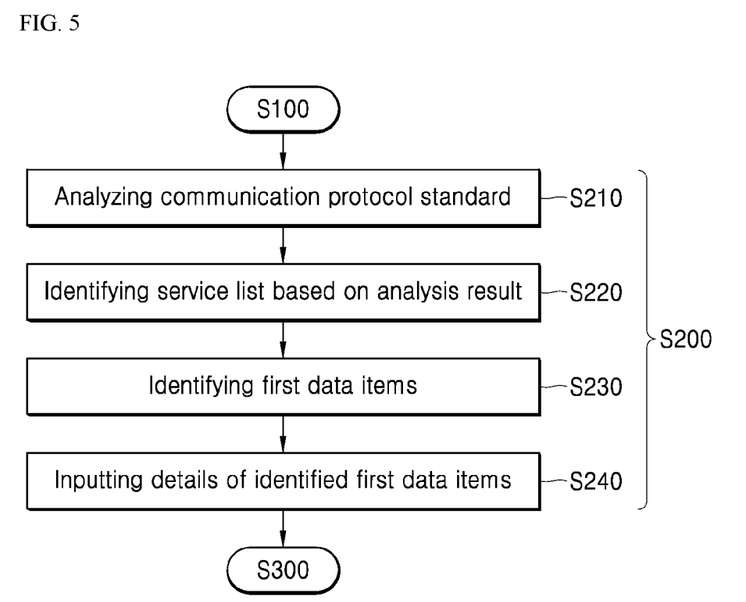
FIG. 5 is a flow chart for describing S200 in FIG. 3.
Figure 6:
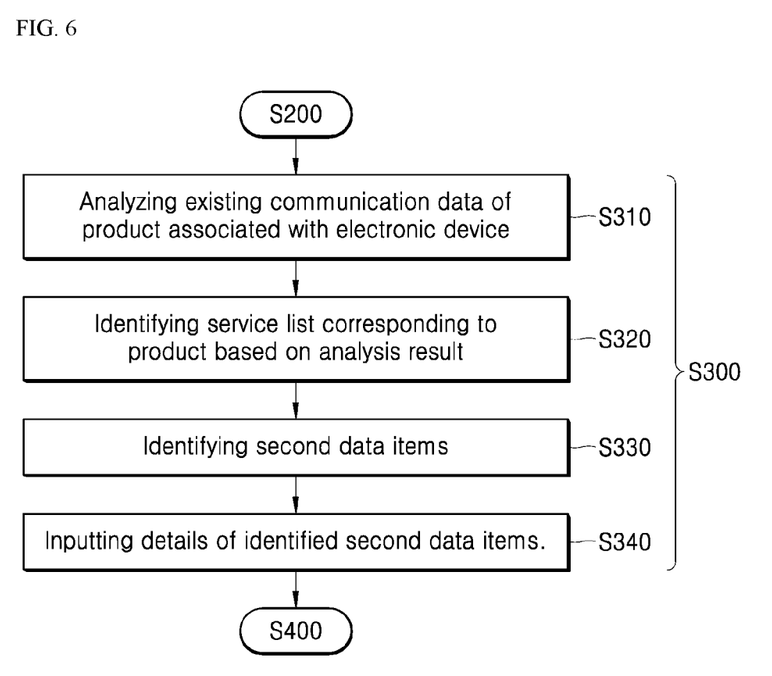
FIG. 6 is a flow chart for describing S300 in FIG. 3.
Figure 7:
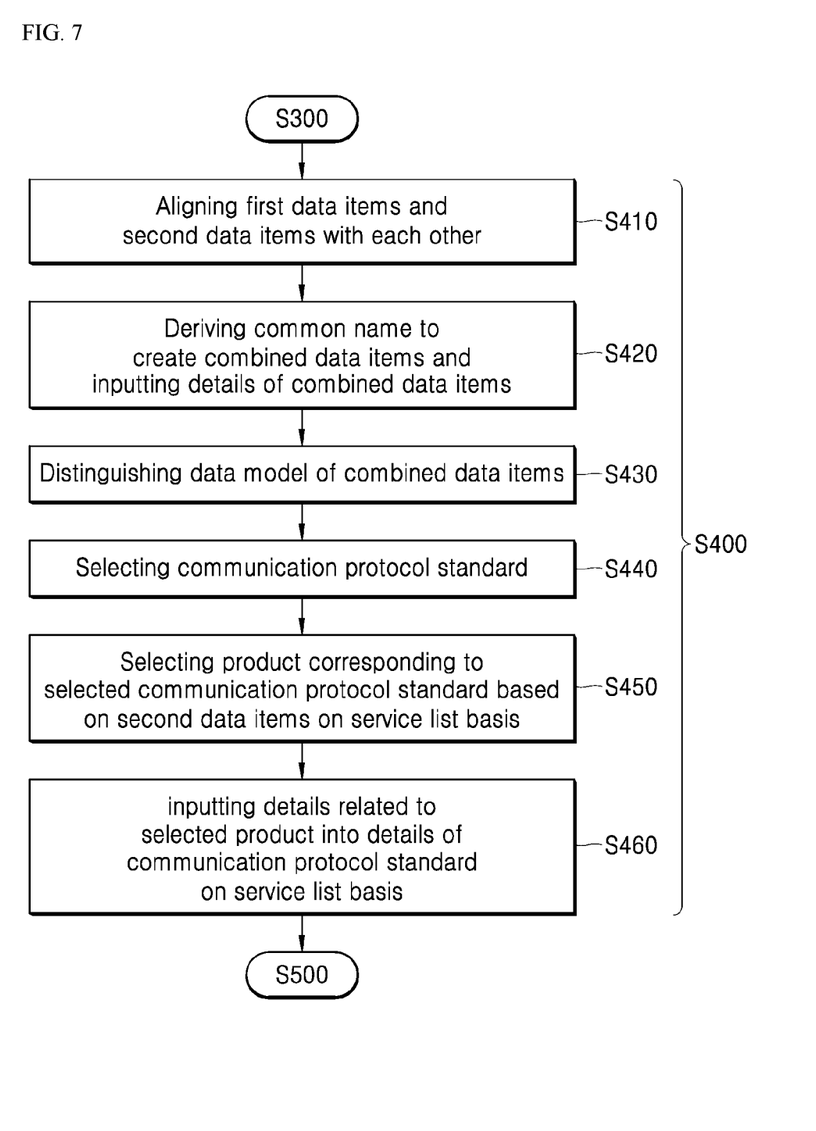
FIG. 7 is a flow chart for describing S400 in FIG. 3.

FIG. 3 is a flow chart for describing the communication data modeling method by the communication data model creation system of FIG. 2. FIG. 4 is a flow chart for describing S100 in FIG. 3. FIG. 5 is a flow chart for describing S200 in FIG. 3. FIG. 6 is a flow chart for describing S300 in FIG. 3. FIG. 7 is a flow chart for describing S400 in FIG. 3.

Referring to FIG. 2 to FIG. 4, first, service lists of the electronic device may be identified S100. In one example, the operation S100 may be performed by the identification unit 110.

Specifically, in the operation S100 for identifying the service lists of the electronic device, it may be determined whether or not there is a communication protocol standard S110.

In this connection, when there are the communication protocol standards associated with the electronic device, a representative communication protocol standard may be selected to derive the service lists of the electronic device S120.

That is, the identification unit 110 may select the representative communication protocol standard from a communication protocol standard list stored in a basic communication data collection list.

In one example, the basic communication data collection list may be stored in memory (not shown). The memory may be included in the communication data model creation system 100 of FIG. 2 or may be included in an external system.

When the representative communication protocol standard is selected S120, the service lists of the electronic device may be identified based on the selected representative communication protocol standard, and then the details of the identified service lists may be input S130.

In this connection, the service list may include various data items such as, for example, a high-level classification, a middle-level classification, an associated external equipment/organization/user, a standard name, a chapter/section and a specification.

In one example, a classification value for the service may input to the high-level classification. A name of the service may be input to the middle-level classification. The external equipment/organization/user that are associated with or communicate with the electronic device and related to the service may be input to the associated external equipment/organization/user. That is, the associated external equipment/organization/user may be modeled as an actor in use case diagram modeling.

Further, a communication protocol standard name as a source of the service may input to the standard name. A product name as a source of the service may be input to the chapter/section. A function definition or description of the service may be input to the specification.

The input unit 160 may input the identified service name into the middle-level classification item of the service list and input a high-level classification item based on the input service name. Further, the input unit 160 may input details (for example, associated external equipment/organization/user, standard name, chapter/section, and specification) on a service basis as input into the middle-level classification item.

When the operation S130 is completed, the service lists of the electronic device except for the identified service list thereof may be identified based on each of the products of the electronic device, and then the details of the identified product-based service list may be inputted S140.

That is, the operation S140 identifies additional product-based service lists other than the identified service based on the representative communication protocol. The input unit 160 may input the service name identified in the operation S140 to the middle-level classification item of the service list. The input unit may input a high-level classification item based on the input service name. Further, the input unit 160 may input details (e.g., associated external equipment/organization/user, standard name, chapter/section, specification, etc.) for each service input to the middle-level classification item.

To the contrary, in the absence of the communication protocol standard associated with the electronic device, a representative product may be selected to derive the service list of the electronic device S150.

That is, the identification unit 110 may select the representative product from the list of products stored in the basic communication data collection list.

Further, when the representative product is selected S150, a service list of the electronic device may be identified based on the selected representative product, and the details of the identified service list may also be input S160.

The input unit 160 inputs the identified service name into the middle-level classification item of the service list. The input unit may input a high-level classification item based on the input service name. Further, the input unit 160 may input details (for example, associated external equipment/organization/user, standard name, chapter/section, specification, etc.) for each service input to the middle-level classification item.

Referring to FIG. 2, FIG. 3, and FIG. 5, after the operation S100, the first communication data sheet for the electronic device's communication protocol standard is created S200.

Specifically, the operation S200 for creating the first communication data sheet includes an operation S210 for analyzing the communication protocol standard of the electronic device, an operation S220 for identifying a service list corresponding to the communication protocol standard based on the analysis result, an operation S230 for identifying first data items associated with the communication protocol standard based on the identified service list, and an operation 240 for inputting details of the identified first data items.

In this connection, when the first communication data sheet creation unit 120 analyzes the communication protocol standard of the electronic device S210, there may be a plurality of communication protocol standards of the electronic device. In this case, the first communication data sheet creation unit 120 may analyze each communication protocol standard.

For example, when the electronic device is an inverter, the first communication data sheet creation unit 120 may analyze each of the plurality of communication protocol standards associated with the inverter (e.g., Sunspec, IEC-61850, CiA-402, CIP AC Drive, etc.).

When the communication protocol standard analysis is completed S210, the first communication data sheet creation unit 120 may identify a service list corresponding to the communication protocol standard based on the analysis result.

In this connection, the identified service list may be configured such that the same service data items are mapped to each other. The service list may include, for example, the high-level classification, the middle-level classification, and first data items based on the communication protocol standard.

That is, when the first communication data sheet creation unit 120 identifies the service list, the input unit 160 inputs the identified service name into the middle-level classification item of the service list. The input unit may input a high-level classification item based on the input service name.

The first communication data sheet creation unit 120 may then identify the first data items associated with the communication protocol standard based on the identified service list S230.

In this connection, the first data items may include various items such as ID or label field, a data type field, a data unit field, a read/write field, a mandatory/optional field and a specification field.

In one example, an identifier (i.e., a space-free abbreviation or code value) that is configured for discrimination between the identical services may be input to the ID or label field. A data type (e.g., unit16, int16, uint32, int32, float, double, string) that is input to the first data items may be input to the data type field. A data unit type (e.g., W, A, V, etc.) of the first data items may be input to the data unit field. A data readable/writeable option (e.g., R (Read-Only), W (Write-Only), and RW (Read/Write)) of the first data items may be input to the read/write field. The mandatory/optional field may be set to indicate whether data of the first data items is mandatory or optional (for example, M (Mandatory), O (Optional), C (Conditional)). A detailed description of the data of the first data items may be input to the specification field.

The label may be a full name of the ID, or a spacing may be applied to the label.

In one example, when there are plural communication protocol standards, there may be first data items for each communication protocol standard.

When the first data items are identified S230, the details of the identified first data items may be input S240.

That is, the input unit 160 may input details of the identified first data items (e.g., data type field, data unit field, read/write field, mandatory/optional field, specification field, etc.).

Referring to FIG. 2, FIG. 3 and FIG. 6, after the operation S200, the second communication data sheet for the product associated with the electronic device may be created.

In one example, the operations S200 and S300 may be performed simultaneously. Alternatively, the operation S300 may be performed before the operation S200. However, for convenience of description herein, an example will be described in which the operation S300 is performed after the operation S200.

Specifically, the operation S300 for creating the second communication data sheet may include an operation S310 for analyzing existing communication data of a product related to the electronic device, an operation S320 for identifying a service list corresponding to the product based on the analysis result, an operation S330 for identifying second data items related to the product based on the identified service list, and an operation S340 of inputting the details of the identified second data items.

In this connection, when the second communication data sheet creation unit 130 analyzes the existing communication data of the product related to the electronic device S310, there is more than one product related to the electronic device. In this case, the second communication data sheet creation unit 130 may also analyze existing communication data for each product.

For example, when the electronic device is an inverter, products related to the inverter (for example, LSP-S003L (KR), LSP-S004L (JP), LSP-S006L (JP), LSP-T030LT, LSP-T250L/LSP-T500L (JP), etc.) may be analyzed.

When the analysis of the existing communication data of the product is completed S310, the second communication data sheet creation unit 130 may identify the service list corresponding to the product based on the analysis result S320.

In this connection, the identified service list may be configured such that the same service data items may be mapped to each other. The service list may include, for example, a high-level classification, a middle-level classification, and second data items based the communication protocol standard.

The service list may include, for example, the high-level classification, the middle-level classification, and second data items based on the product.

That is, when the second communication data sheet creation unit 130 identifies the service list, the input unit 160 inputs the identified service name to the middle-level classification items of the service list and inputs the high-level classification items based on the input service name.

The second communication data sheet creation unit 130 may then identify the second data items associated with the product based on the identified service list S330.

In this connection, the second data items may include common items and other items (or Modbus items) by way of example. The common items may include, for example, ID/label, data type, and data unit. Other items may include addresses and sizes.

In one example, an identifier (i.e., a space-free abbreviation or code value) that is configured for discrimination between the identical services may be input to the ID or label field. A data type (e.g., unit16, int16, uint32, int32, float, double, string) that is input to the second data items may be input to the data type field. A data unit type (e.g., W, A, V, etc.) of the second data items may be input to the data unit field. A data readable/writeable option (e.g., R (Read-Only), W (Write-Only), and RW (Read/Write)) of the first data items may be input to the read/write field. A communication memory address or offset value of the second data items may be input into the address field. A data size of the second data items (e.g., a size of Byte unit) may be input to the size field.

In one example, when there is more than one product, there may be second data items for each product.

When the second data items are identified S330, the details of the identified second data items may be input S340.

That is, the input unit 160 may input the details of the identified second data items (for example, ID/label, data type, data unit, address, size, and the like).

Referring to FIG. 2, FIG. 3 and FIG. 7, after the operation S300, the first communication data sheet and the second communication data sheet may be combined to create the final communication data sheet S400.

Specifically, the operation S400 for creating the final communication data sheet may include an operation S410 for aligning first data items and second data items with each other, deriving a common name of each of pairs of corresponding data items between the first data items and second data items to create combined data items, an operation S420 for inputting details of the combined data items based on the details of the first data items and the details of the second data items, an operation S430 for distinguishing a data model of the combined data items, an operation S440 for selecting the communication protocol standard of the electronic device, an operation S450 for selecting a product corresponding to the selected communication protocol standard based on the second data items on a service list basis, and an operation 460 for inputting the details related to the selected product into the details of the communication protocol standard on a service list basis.

In this connection, when the final communication data sheet creation unit 140 aligns the first data items and second data items with each other S410, the final communication data sheet creation unit 140 may select the pairs of the corresponding data items between the first data items and the second data items (i.e., the same data items) and may allocate the selected same data items to the same line.

In this case, when the ID items are selected as the pair of the corresponding data items, the first and second ID items of the first data items and the second data items may be allocated to the same line.

In one example, when a certain data item exists among the first data items but does not exist among the second data items, a blank may be defined in a corresponding line of the second data items.

In another example, when a certain data item exists among the second data items but does not exist among the first data items, a blank may be defined in a corresponding line of the first data items.

When the alignment process is completed, the final communication data sheet creation unit 140 may derive a common name of each of the pairs of the corresponding data items between the first data items and the second data items, thereby to create the combined data items. The input unit 160 may also input the details of the combined data items based on the details of the first data items and the details of the second data items.

For example, the final communication data sheet creation unit 140 derives the common name between the IDs or labels among the first and second data items, and then creates the combined data items based on the derived common name.

Following rules may be applied to derive the common name:

1) 'ID' string consists of {uppercase, lowercase, number, '_'}

2) A first letter of 'ID' may be capitalized

3) When the 'label' is long, words constituting the label may be abbreviated (when abbreviating the words, a first letter of each of the words is capitalized 4) Distinction between words may be made by using '_' therebetween by capitalizing a first letter of each of the words 5) Duplicate 'ID' values should not exist within the same service data item (middle-level classification).

In one example, when the ID or label exists among the second data items but does not exist among the first data items, the ID and label may be input to the combined data items in following conditions:

1) when the ID and label must be input to the combined data items—when the ID and label have been input to a portion greater than half of the entire product list 2) when the ID and label may not be input to the combined data items—when the ID and label have been input a portion smaller than or equal to half of the entire product list (in this case, an expert may determine whether to input the ID and label).

In this connection, the combined data items may include various items such as the service list (high-level classification, middle-level classification), a model type, ID, label, a specification, a data type, a data unit, an initial value, a read/write field, a mandatory/optional field, remarks, etc.

In one example, the service list field may include the high-level classification and a middle-level classification. The model type field may include a value that classifies data region characteristic. The ID field may contain a common name ID. The label field may contain the common name label. The data type field may contain a data type (for example, unit16, int16, uint32, int32, float, double, string, etc.). The data unit field may contain the data unit type (e.g., W, A, V, etc.) of the combined data items. The read/write field may include a data read/write option of the combined data items (for example, R (Read-Only), W (Write-Only), and RW (Read/Write)) of the combined data items. The mandatory/optional field may be set to indicate whether data of the combined data items is mandatory or optional (for example, M (Mandatory), O (Optional), C (Conditional)). The remarks field may contain other contents.

As described above, the combined data items may be composed of the first data items and the second data items. Thus, the input unit 160 may input the details of the combined data items based on the details of the first data items and the details of the second data items.

When the details of the combined data items are input S420, the data model of the combined data items may be distinguished S430.

For example, the final communication data sheet creation unit 140 may distinguish the data model of the combined data items as follows.

1) when the corresponding data items are defined for the service identified based on the communication protocol standard, 'Base' may be input to the model type 2) when the corresponding data items are defined for the service identified based on the product, 'SPG' may be input to the model type 3) when the corresponding data items are derived according to a specific country/market, 'Extended' may be input to the model type When the data model type has been distinguished S430, the communication protocol standard of the electronic device may be selected S440.

Specifically, in one example, the final communication data sheet creation unit 140 may select one of the communication protocol standards input to the first communication data sheet.

When the communication protocol standard is selected, a product corresponding to the selected communication protocol standard may be selected based on the second data items on a service list basis S450.

Specifically, for example the final communication data sheet creation unit 140 may select a representative product based on product-based details (that is, second data items) input to the second communication data sheet on a service list basis.

For example, when the electronic device is an inverter, and there are a plurality of products associated with the inverter and Modbus is selected as the communication protocol standard, an inverter-related product may be selected to correspond to Modbus for each service.

When the product selection is completed, the input unit 160 may input the details (for example, address and size) related to the selected product to the details (for example, address and size) of the selected communication protocol standard for each service list.

When the final communication data sheet has been created via the above-described process S400, the communication data model creation unit 150 may create the communication data model including a combination of the product and communication protocol standard based on the final communication data sheet.

As described above, the standardized communication data model may be created using the communication data modeling method according to the present disclosure. Thus, the product developer can easily develop a product based on the standardized communication data model.

In one example, the communication data modeling method in accordance with the present disclosure as described above may be implemented using various means. For example, the communication data modeling method in accordance with the present disclosure may be implemented in hardware, firmware, software, or a combination thereof.

In the hardware implementation of the communication data modeling method in accordance with the present disclosure, the method may be implemented using at least one of ASICs (Application Specific Integrated Circuits), DSPs (Digital Signal Processors), DSPDs (Digital Signal Processing Devices), PLDs (Programmable Logic Devices), FPGAs (Field Programmable Gate Arrays), a processor, a controller, a microcontroller, and a microprocessor.

In the firmware or software implementation of the communication data modeling method in accordance with the present disclosure, the method may be implemented in a form of modules, procedures, or functions that perform the functions or operations as described above. A software code may be stored in a memory unit and may be driven by the processor. The memory unit may be located inside or outside the processor and may exchange data with the processor via various known means.

It will be understood by those skilled in the art that various changes in form and details may be made to the present disclosure without departing from the spirit and scope of the invention as defined by the appended claims. Thus, the present disclosure is not limited to the above-described embodiments and the accompanying drawings.

What is claimed is:

1. A communication data modeling method comprising:
identifying service lists of an electronic device;
creating a first communication data sheet about a communication protocol standard of the electronic device;
wherein the creating of the first communication data sheet includes: analyzing the communication protocol standard of the electronic device; identifying a service list corresponding to the communication protocol standard based on the analysis result identifying first data items associated with the communication protocol standard based on the identified service list and inputting details of the identified first data items;
creating a second communication data sheet about a product associated with the electronic device;
wherein the creating of the second communication data sheet includes: analyzing existing communication data of a product associated with the electronic device; identifying a service list corresponding to the product based on the analysis result identifying second data items associated with the product based on the identified service list and inputting details of the identified second data items;
creating a final communication data sheet by combining the first communication data sheet and the second communication data sheet;
wherein the communication protocol standard of the electronic device includes a plurality of communication protocol standards, wherein the product associated with the electronic device includes a plurality of products; and creating a communication data model based on the final communication data sheet.

2. The communication data modeling method of claim 1, wherein identifying the service lists of the electronic device includes:

when a communication protocol standard associated with the electronic device is present, selecting a representative communication protocol standard to derive the service lists of the electronic device; and when a communication protocol standard associated with the electronic device is absent, selecting a representative product to derive the service lists of the electronic device.

3. The communication data modeling method of claim 1, wherein the representative communication protocol standard is selected, wherein the identifying of the service lists of the electronic device includes:

identifying the service lists of the electronic device based on the selected representative communication protocol standard;

inputting details of the identified service lists;

identifying remaining service lists of the electronic device excluding the identified service lists, based on a product of the electronic device; and inputting details of the identified product-based service lists.

4. The communication data modeling method of claim 2, wherein the representative product is selected, wherein the identifying of the service lists of the electronic device includes:

identifying the service lists of the electronic device based on the selected product; and inputting details of the identified service lists.

5. The communication data modeling method of claim 1, wherein the creating of the final communication data sheet includes:

aligning the first data items and second data items with each other;

deriving a common name of each of pairs of corresponding data items between the first data items and second data items to create combined data items;

inputting details of the combined data items based on the details of the first data items and the details of the second data items;

distinguishing a data model of the combined data items;

selecting a communication protocol standard of the electronic device;

selecting a product corresponding to the selected communication protocol standard based on the second data items and on a service list basis; and inputting details related to the selected product into details of the communication protocol standard on a service list basis.

\* \* \* \* \*